US012662192B2

(12) United States Patent
Maltisotto

(10) Patent No.: US 12,662,192 B2
(45) Date of Patent: Jun. 23, 2026

(54) UNDERBODY PROTECTION APPARATUS TO BE ARRANGED BELOW A TRACTION BATTERY ON THE UNDERBODY OF AN AT LEAST SEMI-ELECTRICALLY DRIVEABLE MOTOR VEHICLE

(71) Applicant: Dr. Ing. h.c. F. Porsche Aktiengesellschaft, Stuttgart (DE)

(72) Inventor: Salvatore Maltisotto, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 476 days.

(21) Appl. No.: 18/210,833

(22) Filed: Jun. 16, 2023

(65) Prior Publication Data

US 2024/0034411 A1 Feb. 1, 2024

(30) Foreign Application Priority Data

Jul. 28, 2022 (DE) ..................... 10 2022 118 977.5

(51) Int. Cl.
H01M 10/613 (2014.01)
B60K 1/04 (2019.01)
(Continued)

(52) U.S. Cl.
CPC .............. B62D 21/155 (2013.01); B60K 1/04 (2013.01); H01M 10/613 (2015.04);
(Continued)

(58) Field of Classification Search
None
See application file for complete search history.

(56) References Cited

U.S. PATENT DOCUMENTS 10,622,610 B2 4/2020 Seo et al.
2013/0059175 A1 3/2013 Engel et al.
(Continued)

FOREIGN PATENT DOCUMENTS

CN 111907310 A 11/2020
DE 102020003660 A1 7/2020
(Continued)

OTHER PUBLICATIONS

Swedish Search Report for Swedish Application No. 2350789-0 dated Feb. 13, 2024, 9 pages.
(Continued)

*Primary Examiner* — Carlos Barcena
(74) *Attorney, Agent, or Firm* — Buchanan Ingersoll & Rooney PC

(57) ABSTRACT

An underbody protection apparatus is arrangable below a traction battery on the underbody of an at least semi-electrically driveable motor vehicle. The apparatus includes an underbody protection plate for protecting the underbody of the motor vehicle, a gas-conducting structure arranged between the traction battery and the underbody protection plate and arranged on the underbody protection plate for conducting a gas exiting from the traction battery along the underbody protection plate. The gas-conducting structure is arranged on the traction battery such that a gas can be introduced into the gas-conducting structure via a degassing outlet of the traction battery. The gas-conducting structure includes a plurality of branching points for branched conduction of the gas exiting from the traction battery along the underbody protection plate. The gas-conducting structure includes at least one gas outlet opening for discharging the gas exiting from the traction battery and being conducted along the underbody protection plate.

11 Claims, 5 Drawing Sheets

(51) Int. Cl.
| | |
|---|---|
| *B62D 21/15* | (2006.01) |
| *H01M 50/242* | (2021.01) |
| *H01M 50/30* | (2021.01) |

(52) U.S. Cl.
CPC ......... *H01M 50/242* (2021.01); *H01M 50/30* (2021.01); *B60K 2001/0438* (2013.01); *H01M 2200/20* (2013.01); *H01M 2220/20* (2013.01)

(56) References Cited

U.S. PATENT DOCUMENTS

| | | | | |
|---|---|---|---|---|
| 2015/0072184 A1* | 3/2015 | Kusunoki | ........... | H01M 50/394 |
| | | | | 429/54 |
| 2020/0353807 A1 | 11/2020 | Kellner et al. | | |
| 2021/0104801 A1 | 4/2021 | Chu et al. | | |
| 2021/0336298 A1* | 10/2021 | Thurmeier | ............ | H01M 10/48 |
| 2021/0359374 A1 | 11/2021 | Reinprecht et al. | | |
| 2022/0021068 A1 | 1/2022 | Zeng et al. | | |
| 2022/0077539 A1 | 3/2022 | Ren et al. | | |
| 2022/0223972 A1 | 7/2022 | Zhu et al. | | |
| 2022/0311088 A1 | 9/2022 | Ryu et al. | | |
| 2024/0034411 A1 | 2/2024 | Maltisotto | | |
| 2025/0346105 A1* | 11/2025 | Huber | ................. | H01M 50/213 |

FOREIGN PATENT DOCUMENTS

| | | |
|---|---|---|
| DE | 102021005538 A1 | 12/2021 |
| DE | 102020123152 A1 | 3/2022 |
| DE | 102021204370 A1 | 11/2022 |
| DE | 102021119168 A1 | 1/2023 |
| EP | 3817086 A1 | 5/2021 |
| JP | 2014192052 A | 10/2014 |
| KR | 20180006150 A | 1/2018 |
| WO | 2021180469 A1 | 9/2021 |
| WO | 2021210744 A1 | 10/2021 |
| WO | 2022006894 A1 | 1/2022 |
| WO | 2022043259 A1 | 3/2022 |

OTHER PUBLICATIONS

Office Action (The First Office Action) issued Mar. 31, 2026, by the State Intellectual Property Office of People's Republic of China in corresponding Chinese Patent Application No. 202310419781.7 and an English translation of the Office Action. (13 pages).

* cited by examiner

UNDERBODY PROTECTION APPARATUS TO BE ARRANGED BELOW A TRACTION BATTERY ON THE UNDERBODY OF AN AT LEAST SEMI-ELECTRICALLY DRIVEABLE MOTOR VEHICLE

CROSS-REFERENCE TO RELATED APPLICATION

This application claims priority to German Patent Application No. 10 2022 118 977.5, filed Jul. 28, 2022, the content of such application being incorporated by reference herein in its entirety.

FIELD OF THE INVENTION

The present invention relates to an underbody protection apparatus to be arranged below a traction battery on the underbody of an at least semi-electrically driveable motor vehicle, a battery system comprising such an underbody protection apparatus, and a motor vehicle having such an underbody protection apparatus or such a battery system.

SUMMARY OF THE INVENTION

To protect traction batteries arranged on the underbody of electrically operated motor vehicles, reinforcement structures are typically used today in order to absorb impacts or rock chips and the like in order to prevent a deformation of battery cells placed on the underbody of a motor vehicle and a short circuit triggered externally as a result. The reinforcement structures also serve to protect against corrosion damage to the battery systems by spray water or road salt. In addition to effectively preventing an externally triggered short circuit, however, in the context of increasing the driving safety in electric vehicles, it is also necessary to prevent internally triggered short circuits and/or to minimize the resulting damage. It has been found to be effective to quickly and effectively discharge the hot battery gases exiting from an automobile battery module or system in case of internal short circuits in battery systems in order to prevent the resulting triggering of a chain reaction, which can lead to fire or the explosion of the entire battery module or system.

For this purpose, it is known to provide traction battery systems of motor vehicles having a gas outlet system for the discharge of battery gases into the atmosphere. These gas discharge systems are partially fed through reinforcement structures arranged on the underbody of a motor vehicle.

In a disadvantageous manner, the discharge of the battery gases from a traction battery system of motor vehicles due to the high temperature of the gases partially leads to the ignition of the battery gases when exiting from the gas discharge systems or when still within the gas discharge systems, which in turn can lead to heavy fires or explosions of the entire battery system.

Therefore, the problem addressed by the present invention is to at least partially rectify the disadvantages described above. In particular, the problem addressed by the present invention is to provide an underbody protection apparatus to be arranged below a traction battery on the underbody of an at least semi-electrically driveable motor vehicle, which, in addition to a prevention of externally triggered short circuits of battery cells of a traction battery, prevents internally triggered short circuits or minimizes any damage caused by internally triggered short circuits by absorbing impacts.

Technical features that are disclosed regarding the underbody protection apparatus according to aspects of the invention also apply in connection with the battery system according to aspects of the invention and the motor vehicle according to aspects of the invention, and vice versa, so that reference is or can always be mutually made with respect to the disclosure regarding the individual aspects of the invention. Expedient embodiments of the invention are stated in the dependent claims.

According to aspects of the invention, an underbody protection apparatus to be arranged below a traction battery on the underbody of an at least semi-electrically driveable motor vehicle is provided. The underbody protection apparatus according to aspects of the invention comprises an underbody protection plate for protecting the underbody of the motor vehicle, as well as a gas-conducting structure arranged between the traction battery and the underbody protection plate and arranged on the underbody protection plate for conducting a gas exiting from the traction battery along the underbody protection plate. According to the present invention, the gas-conducting structure can be arranged on the traction battery such that a gas can be introduced into the gas-conducting structure via a degassing outlet of the traction battery. In addition, the gas-conducting structure comprises a plurality of branching locations for branched conduction of the gas exiting from the traction battery along the underbody protection plate, as well as at least one gas outlet opening for discharging the gas exiting from the traction battery and being conducted along the underbody protection plate. In particular, an electric vehicle or a hybrid vehicle can be understood as an at least semi-electrically driveable vehicle. According to the present invention, an underbody protection apparatus or underbody protection plate can be understood to mean an apparatus or plate that can be arranged on the underbody of a motor vehicle and that have a reinforcing protective effect for absorbing impacts. Branching points in the context of the invention can furthermore be understood to mean locally delimited recesses or clearances, in particular in a gas-conducting structure, in which a gas flow can be guided in two opposite directions.

By contrast to known gas discharge systems of traction batteries of motor vehicles, the underbody protection apparatus according to aspects of the invention not only provides a structurally stabilizing effect for absorbing impacts on the underbody of an electrically driveable motor vehicle and thus protection of the traction batteries from externally triggered short circuits, but also a significant minimization of damage to battery systems caused by internally triggered short circuits. This significant minimization of the damage caused by internally triggered short-circuits enables the underbody protection apparatus according to aspects of the invention in particular through the gas-conducting structure provided in this context, which allows a long definable conduction of a hot battery gas exiting from the traction battery along the underbody protection plate and thus an effective cooling of the exiting gas, which significantly minimizes the likelihood of gas ignition upon exit of the battery gas or still within the gas-conducting structure and significantly increases the driving safety of a driver of an electrically driveable motor vehicle with an underbody protection apparatus according to aspects of the invention.

In the context of a safe and durable design of the subject underbody protection apparatus, it can be particularly advantageous when the underbody protection plate and/or the gas-conducting structure is formed from a heat-resistant material, preferably a metal material, in particular an aluminum or iron material. Such a design allows in particular a quick heat dissipation and thus a quick cooling of the hot battery gas. A design of the underbody protection apparatus, in particular the underbody protection plate made of a metal material, also improves the protection effect against dulled effects, such as rock chips or the like. It is understood that, in addition to a configuration of the underbody protection apparatus made of a metal material, a configuration of a heat-stable plastic or the like can also be provided.

Further, in the context of the safest possible discharge of a gas exiting from the traction battery and being conducted along the underbody protection plate, it can advantageously be provided that the gas-conducting structure is labyrinthe or meandering in form, wherein the gas-conducting structure comprises at least four, preferably at least eight, in particular at least ten branching points for branched conduction of the gas exiting from the traction battery along the underbody protection plate. A large number of branching points offers in particular a long guide path along the underbody protection plate of the present underbody protection apparatus, which leads to a particularly effective cooling of the gas exiting from the traction battery and thus minimizes the risk when discharging the gases into the ambient air. A meandering or labyrinth-like gas-conducting structure also allows in particular that glowing particles exiting from the traction battery can initially remain in corner regions of the gas-conducting structure and cool there, such that the corner regions in this type of structure represent a type of particle trap.

In addition, it can be advantageous when the space arranged within the gas-conducting structure is configured so as to be substantially oxygen-free and/or air-free, wherein the space arranged within the gas-conducting structure is preferably filled with a non-combustible inert gas, in particular with nitrogen or argon. Such a design in particular minimizes the risk of fire and explosion in the event of a thermal runaway of a battery.

To ensure an oxygen-free or air-free environment, it can be advantageously further provided that the at least one gas outlet opening comprises a membrane and/or a valve for controlled discharge of a gas exiting from the traction battery, wherein the membrane and/or the valve is preferably permeable for a gas only starting at a certain positive pressure. By arranging a membrane or valve at the gas outlet opening, it is possible in particular to prevent the entry of air into the underbody protection apparatus, but at the same time to guarantee a reliable discharge of a gas leaking from the traction battery. It is understood that, in addition to a membrane or valve, other equivalent means can be provided to ensure the same purpose. It is further understood that, in addition to an arrangement of a single gas outlet opening, a plurality of further gas outlet openings can also be provided, which can preferably be arranged side-by-side on the end side of a present underbody protection apparatus.

In addition, with regard to a stable and long-lasting design of a present underbody protection apparatus, it can be particularly advantageous when local reinforcement regions are provided for gas deflection, wherein the local reinforcement regions are preferably arranged directly on the underbody protection plate, wherein a local reinforcement region is arranged in particular between two branching points.

The reinforcement regions can preferably be configured in the form of structurally strengthening plates or the like, which can be specially coated, for example, in order to achieve a high resistance to a hot gas flow, in particular at high gas pressures or molecular velocities. The reinforcement regions can preferably be attached to the underbody protection plate in parallel with each other at continuous distances, wherein in particular a reinforcement region can be arranged below a degassing outlet of a traction battery.

In the context of discharging as safely as possible a gas exiting from a traction battery and being conducted along the underbody protection plate, it can further advantageously be provided that the underbody protection plate is configured hollow for protection of the underbody, wherein the underbody protection plate preferably comprises a top structural layer, a bottom structural layer, and a support structure arranged between the top and bottom structural layers.

It can further be provided that the support structure comprises an upper support layer, a lower support layer, as well as a honeycomb core layer arranged between the upper and lower support layers as a gas-conducting structure for conducting a gas exiting from the traction battery along the underbody protection plate, wherein a local weak point for gas entry is preferably arranged within the underbody protection plate, which can in particular be arranged directly on the degassing outlet of the traction battery. The present honeycomb-shaped structure between an upper and lower support layer or lower and upper structure layer offers in particular a predefinable, long guide path along the underbody protection plate of the present underbody protection apparatus, which leads to a particularly effective cooling of the gas exiting from the traction battery and thus minimizes the risk when discharging the gases into the ambient air.

The presently provided weak point can preferably be in the form of materially tapering regions, which can be arranged in the upper structural layer and/or the upper support layer.

The subject matter of the invention is furthermore a battery system to be arranged on the underbody of an at least semi-electrically driveable motor vehicle, comprising an underbody protection apparatus according to any one of the preceding claims as well as a traction battery arranged above the underbody protection apparatus for propelling the motor vehicle. Thus, the battery system according to aspects of the invention has the same advantages as already extensively described with respect to the underbody protection apparatus according to aspects of the invention. According to the present design, the battery system can thus in particular comprise an underbody protection plate for protecting the underbody of the motor vehicle as well as a gas-conducting structure arranged between the traction battery and the underbody protection plate and on the underbody protection plate for conducting a gas exiting from the traction battery along the underbody protection plate. The gas-conducting structure can preferably be arranged directly at a degassing outlet of the traction battery.

In order to further minimize the risk of a battery going up thermally ("thermal runaway"), in particular the fire and/or explosion hazard, it is conceivable that an active and/or passive cooling apparatus is provided, wherein the active or passive cooling apparatus is preferably arranged directly on the underbody protection plate of the underbody protection apparatus.

Furthermore, the subject-matter of the invention is also a motor vehicle comprising an underbody protection apparatus as described above, in particular comprising a battery system as described above. The motor vehicle according to aspects of the invention thus has the same advantages as already extensively described with respect to the underbody protection apparatus according to aspects of the invention and the battery system according to aspects of the invention.

BRIEF DESCRIPTION OF THE DRAWINGS

Further advantages, features, and details of the invention arise from the following description, in which exemplary embodiments of the invention are described in detail with reference to the drawings. The features mentioned in the claims and in the description can be essential for the invention individually or in any combination.

DETAILED DESCRIPTION OF THE INVENTION

Figure 1:
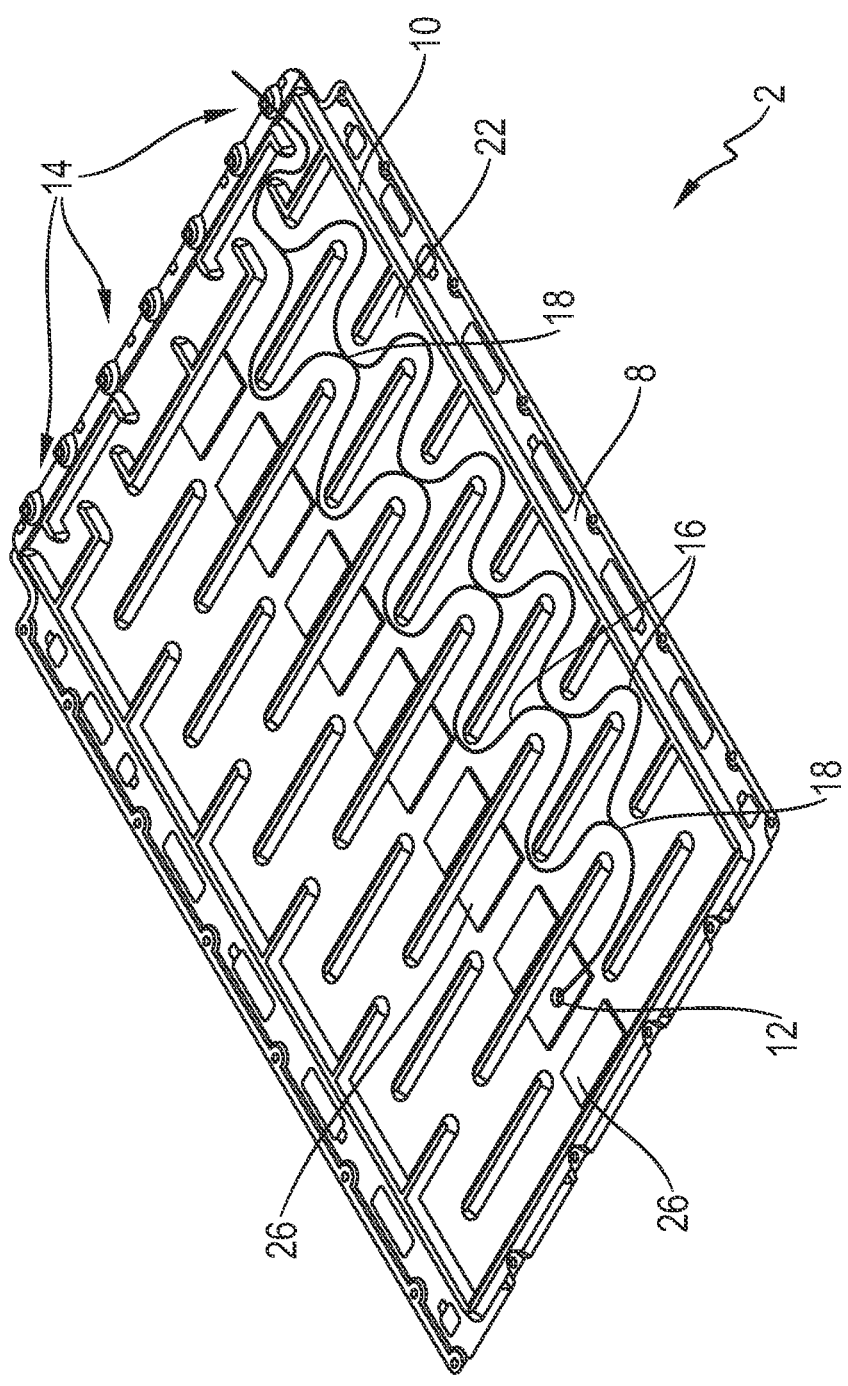
FIG. 1 depicts the underbody protection apparatus according to aspects of the invention to be arranged below a traction battery on the underbody of an at least semi-electrically driveable motor vehicle, according to a first exemplary embodiment.

FIG. 1 shows the underbody protection apparatus 2 according to aspects of the invention to be arranged below a traction battery 6 on the underbody of an at least semi-electrically driveable motor vehicle 100, according to a first exemplary embodiment.

As can be seen according to FIG. 1, the underbody protection apparatus 2 comprises an underbody protection plate 8 for protecting the underbody of the motor vehicle 100, a gas-conducting structure 10 arranged between the traction battery 6 and the underbody protection plate 8 and arranged on the underbody protection plate 8 for conducting a gas 16 exiting from the traction battery 6 along the underbody protection plate 8, wherein the gas-conducting structure 10 is arranged on the traction battery 6 such that a gas 16 can be introduced into the gas-conducting structure 10 via a degassing outlet 12 of the traction battery 6, wherein the gas-conducting structure 10 comprises a plurality of branching points 18 for branched conduction of the gas 16 exiting from the traction battery 6 along the underbody protection plate 8, wherein the gas-conducting structure 10 comprises at least one gas outlet opening 14 for discharging the gas 16 exiting from the traction battery 6 and being conducted along the underbody protection plate 8.

The underbody protection plate 8 and/or the gas-conducting structure 10 can advantageously be formed from a heat-resistant material, preferably from a metal material, in particular from an aluminum or iron material.

As can be seen according to FIG. 1, the gas-conducting structure 10 is labyrinthine or meandering in form, wherein the gas-conducting structure 10 comprises at least four, preferably at least eight, in particular at least ten branching points 18 for branched conduction of the gas 16 exiting from the traction battery 6 along the underbody protection plate 8.

It can advantageously be provided that the space 22 arranged within the gas-conducting structure 10 is substantially oxygen-free and/or air-free, wherein the space 22 arranged within the gas-conducting structure 10 can preferably be filled with a non-combustible inert gas, in particular with nitrogen or argon.

The at least one gas outlet 14 can also comprise a membrane 24 and/or a valve 24', not shown in the present case, for controlled discharge of a gas 16 exiting from the traction battery 6, wherein the membrane 24 and/or the valve 24' is preferably only permeable to a gas starting from a certain positive pressure.

Furthermore, according to FIG. 1, it can be seen that local reinforcement regions 26 are provided for gas deflection, wherein the local reinforcement regions 26 are preferably arranged directly on the underbody protection plate 8, wherein a local reinforcement region 26 is arranged in particular between two branching points 18.

Figure 2:
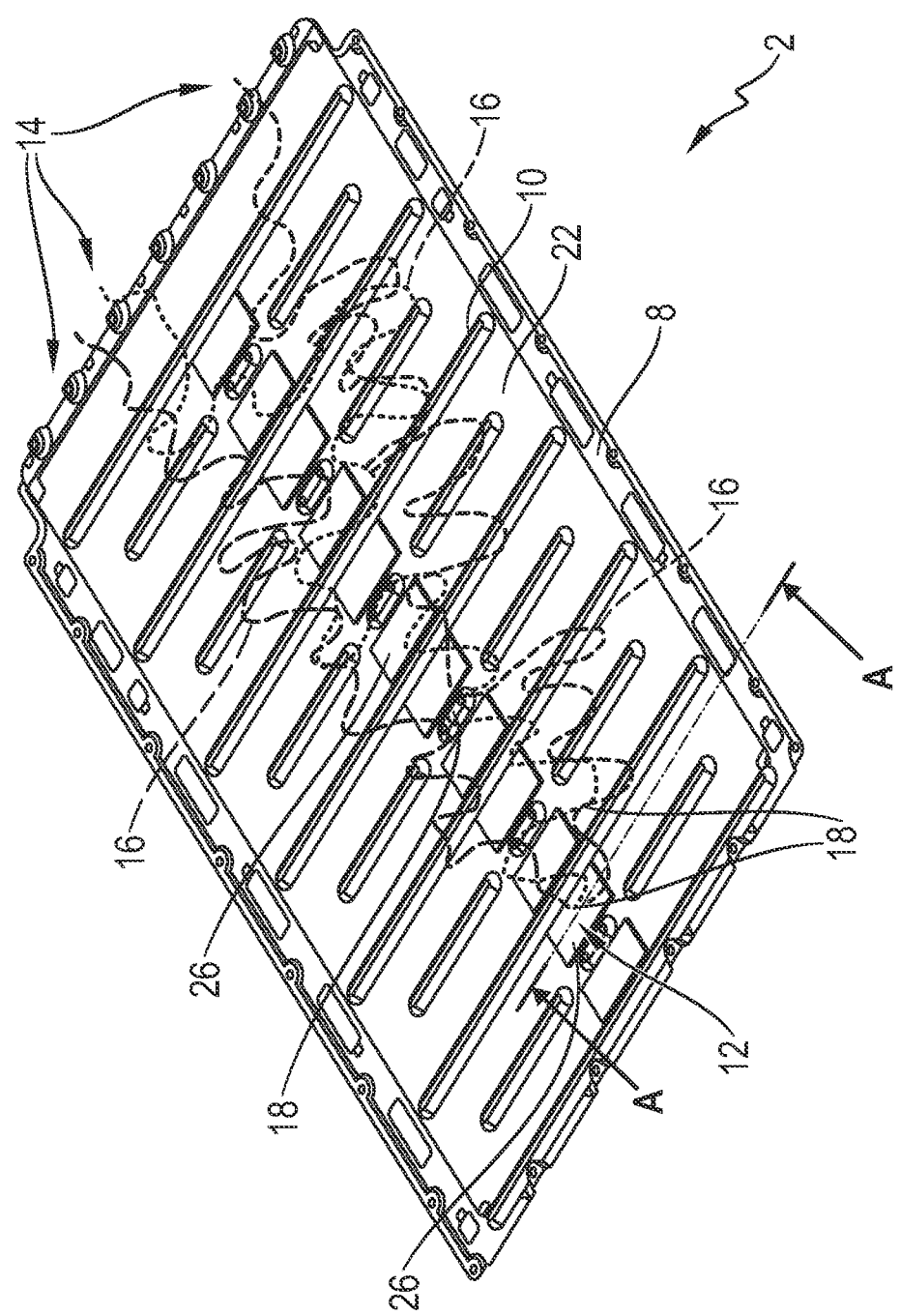
FIG. 2 depicts the underbody protection apparatus according to aspects of the invention to be arranged below a traction battery on the underbody of an at least semi-electrically driveable motor vehicle, according to a second exemplary embodiment.

FIG. 2 shows the underbody protection apparatus 2 according to aspects of the invention to be arranged below a traction battery 6 on the underbody of an at least semi-electrically driveable motor vehicle 100, according to a second exemplary embodiment.

Figure 3:
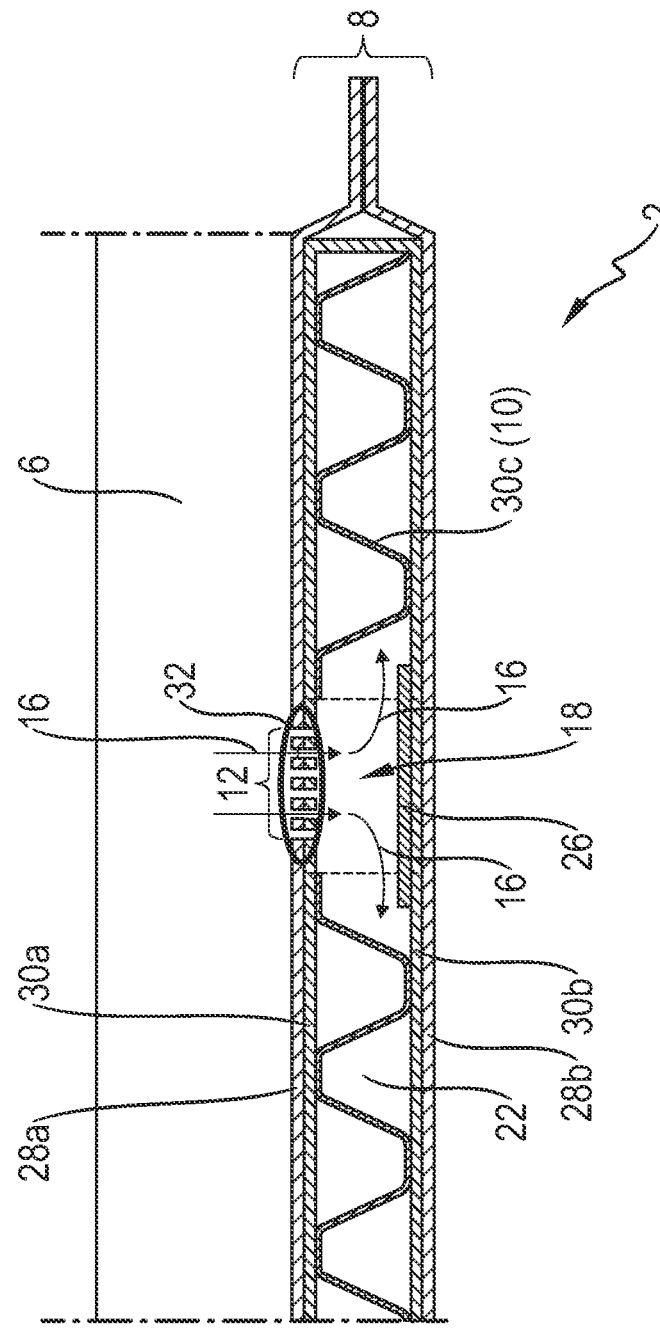
FIG. 3 depicts the underbody protection apparatus according to FIG. 2 in a sectional view according to a section along the section line A-A.

FIG. 3 shows the underbody protection apparatus according to aspects of the invention of FIG. 2 in a sectional view according to a section along the section line A-A of FIG. 2.

As can be seen according to FIGS. 2 and 3, the underbody protection plate 8 of the underbody protection apparatus 2 is configured hollow according to a second exemplary embodiment, wherein the underbody protection plate 8 comprises an upper structural layer 28a, a lower structural layer 28b, and a support structure 30 arranged between the upper and lower structural layers 28a, 28b. The support structure 30 additionally comprises an upper support layer 30a, a lower support layer 30b, as well as a honeycomb core layer 30c arranged between the upper and lower support layers 30a, 30b as a gas-conducting structure 10 for conducting a gas 16 exiting from the traction battery 6 along the underbody protection plate 8, wherein a local weak point 32 for gas entry is arranged within the underbody protection plate 8, which can preferably be arranged directly on the degassing outlet 12 of the traction battery 6.

Figure 4:
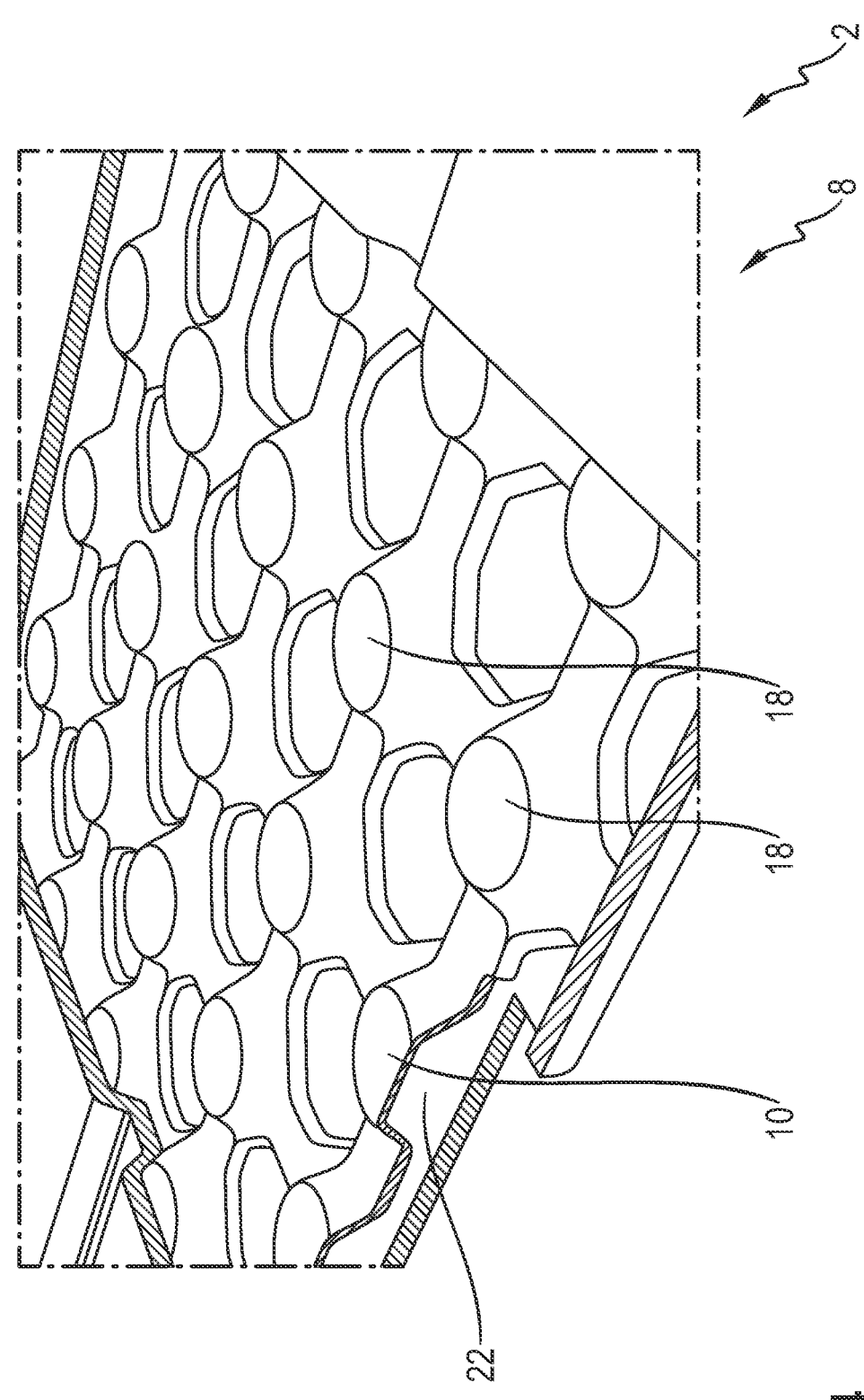
FIG. 4 depicts the underbody protection apparatus according to FIG. 2, according to aspects of the invention, according to a perspective view.

FIG. 4 shows the underbody protection apparatus 2 according to aspects of the invention from FIG. 2 according to a perspective view with the underbody protection plate 8, the gas-conducting structure 10, as well as the branching points 18 arranged within the gas-conducting structure 10 and the space 22 arranged within the gas-conducting structure 10 for conducting a gas 16.

Figure 5:
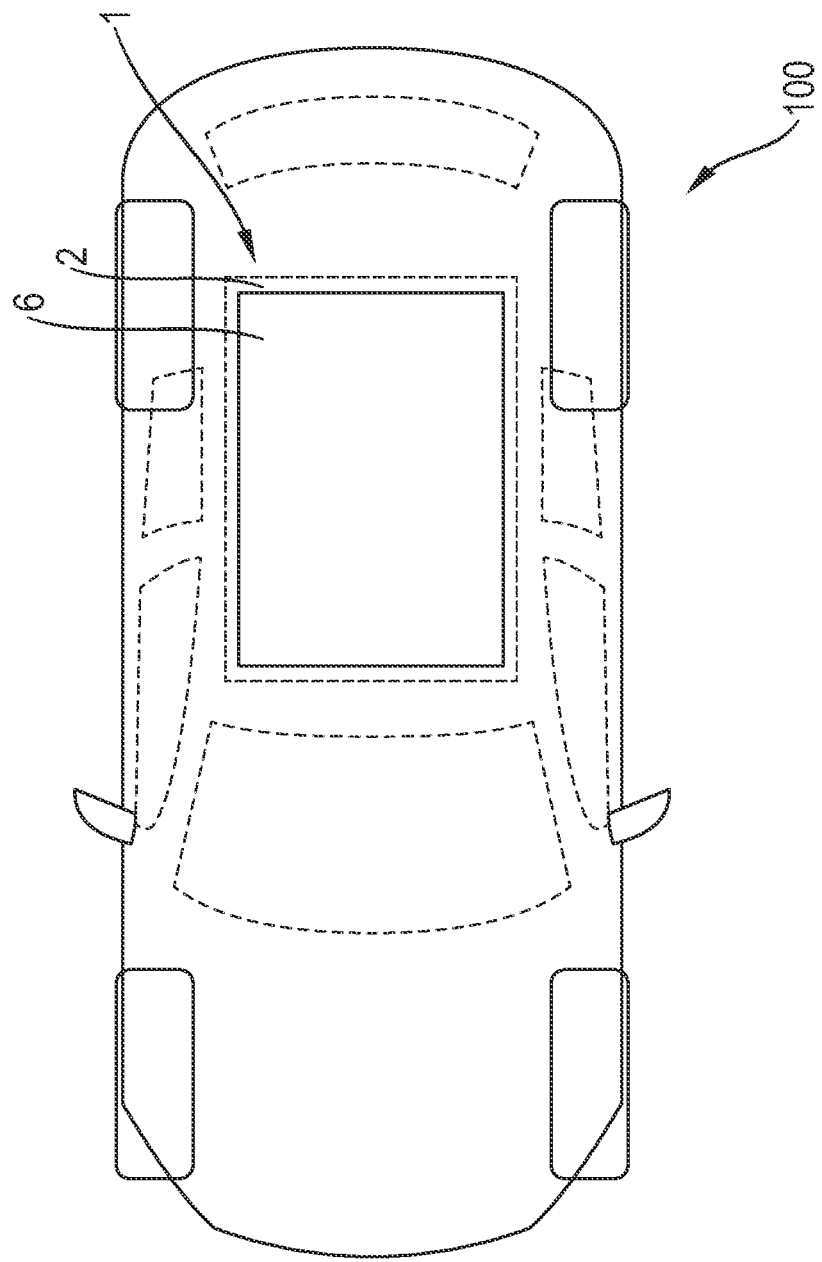
FIG. 5 depicts a motor vehicle with a battery system according to aspects of the invention, comprising an underbody protection apparatus according to aspects of the invention.

FIG. 5 shows a motor vehicle 100 with a battery system 1 according to aspects of the invention, comprising an underbody protection apparatus 2 according to aspects of the invention and a traction battery 6.

The above explanation of the embodiments describes the present invention solely in the context of examples. Of course, individual features of the embodiments can be freely combined with one another, if technically meaningful, without leaving the scope of the present invention.

What is claimed is:

1. An underbody protection apparatus that is arrangeable below a traction battery on an underbody of an at least semi-electrically driveable motor vehicle, said underbody protection apparatus comprising:

an underbody protection plate for protecting the underbody of the motor vehicle, a gas-conducting structure that is (i) arranged between the traction battery and the underbody protection plate, and (ii) arranged on the underbody protection plate for conducting a gas exiting from the traction battery along the underbody protection plate, wherein the gas-conducting structure is arranged on the traction battery such that a gas can be introduced into the gas-conducting structure via a degassing outlet of the traction battery, wherein the gas-conducting structure comprises a plurality of branching points for branched conduction of the gas exiting from the traction battery along the underbody protection plate, wherein local reinforcement regions for gas deflection are arranged directly on the underbody protection plate, wherein one of the local reinforcement regions is arranged between two branching points of the plurality of branching points, and wherein the gas-conducting structure comprises at least one gas outlet opening for discharging the gas exiting from the traction battery and being conducted along the underbody protection plate.

2. The underbody protection apparatus according to claim 1, wherein the underbody protection plate and/or the gas-conducting structure are formed from a heat-resistant material.

3. The underbody protection apparatus according to claim 1, wherein the gas-conducting structure is labyrinthine or meandering in form, and wherein the gas-conducting structure comprises at least four branching points for branched conduction of the gas exiting from the traction battery along the underbody protection plate.

4. The underbody protection apparatus according to claim 1, wherein the at least one gas outlet opening comprises a membrane and/or a valve for controlled discharge of a gas exiting from the traction battery, wherein the membrane and/or the valve is/are permeable for a gas only starting at a certain positive pressure.

5. The underbody protection apparatus according to claim 1, wherein the underbody protection plate is hollow for protection of the underbody, and wherein the underbody protection plate comprises a top structural layer, a bottom structural layer, and a support structure arranged between the top and bottom structural layers.

6. The underbody protection apparatus according to claim 5, wherein the support structure comprises an upper support layer, a lower support layer, as well as a honeycomb core layer arranged between the upper and lower support layers as a gas-conducting structure for conducting a gas exiting from the traction battery along the underbody protection plate, wherein a local weak point for gas entry is arranged within the underbody protection plate and directly on the degassing outlet of the traction battery.

7. The underbody protection apparatus according to claim 1, wherein the underbody protection plate and/or the gas-conducting structure are formed from an aluminum or iron material.

8. A battery system arrangeable on the underbody of an at least semi-electrically driveable motor vehicle, said battery system comprising the underbody protection apparatus according to claim 1 as well as the traction battery arranged above the underbody protection apparatus for propelling the motor vehicle.

9. A motor vehicle comprising the battery system according to claim 8.

10. The battery system according to claim 8, further comprising an active and/or passive cooling apparatus that is arranged directly on the underbody protection plate of the underbody protection apparatus.

11. An underbody protection apparatus that is arrangeable below a traction battery on an underbody of an at least semi-electrically driveable motor vehicle, said underbody protection apparatus comprising:

an underbody protection plate for protecting the underbody of the motor vehicle, a gas-conducting structure that is (i) arranged between the traction battery and the underbody protection plate, and (ii) arranged on the underbody protection plate for conducting a gas exiting from the traction battery along the underbody protection plate, and a space arranged within the gas-conducting structure that is configured so as to be substantially oxygen-free and/or air-free, wherein the space is filled with a non-combustible inert gas, wherein the gas-conducting structure is arranged on the traction battery such that a gas can be introduced into the gas-conducting structure via a degassing outlet of the traction battery, wherein the gas-conducting structure comprises a plurality of branching points for branched conduction of the gas exiting from the traction battery along the underbody protection plate, and wherein the gas-conducting structure comprises at least one gas outlet opening for discharging the gas exiting from the traction battery and being conducted along the underbody protection plate.

* * * * *